(12) United States Patent
Mahé et al.

(10) Patent No.: US 12,522,709 B2
(45) Date of Patent: Jan. 13, 2026

(54) COMPOSITE MATERIAL, METHOD FOR MANUFACTURING A PRODUCT MADE OF A COMPOSITE MATERIAL, AND MACHINE FOR MANUFACTURING A PRODUCT MADE OF A COMPOSITE MATERIAL

(71) Applicant: Storopack Hans Reichenecker GmbH, Metzingen (DE)

(72) Inventors: Anthony Mahé, Pont Saint Martin (FR); Charles Poisson, Cholet (FR)

(73) Assignee: Storopack Hans Reichenecker GmbH, Metzingen (DE)

( * ) Notice: Subject to any disclaimer, the term of this patent is extended or adjusted under 35 U.S.C. 154(b) by 70 days.

(21) Appl. No.: 18/044,878

(22) PCT Filed: Sep. 16, 2021

(86) PCT No.: PCT/EP2021/075490
§ 371 (c)(1),
(2) Date: Mar. 10, 2023

(87) PCT Pub. No.: WO2022/058428
PCT Pub. Date: Mar. 24, 2022

(65) Prior Publication Data
US 2023/0407040 A1     Dec. 21, 2023

(30) Foreign Application Priority Data
Sep. 16, 2020     (EP) .................................... 20196490

(51) Int. Cl.
*C08J 9/35*     (2006.01)
*B29C 44/08*     (2006.01)
(Continued)

(52) U.S. Cl.
CPC .............. *C08J 9/35* (2013.01); *B29C 44/083* (2013.01); *B29C 44/3426* (2013.01);
(Continued)

(58) Field of Classification Search
CPC .......... C08J 9/35; C08J 9/0061; C08J 9/0085; A61L 15/00–15/64
See application file for complete search history.

(56) References Cited

U.S. PATENT DOCUMENTS

| | | |
|---|---|---|
| 2004/0200094 A1 | 10/2004 | Baychar |
| 2010/0119801 A1 | 5/2010 | Errington et al. |
| 2011/0014454 A1 | 1/2011 | Yamamoto et al. |

FOREIGN PATENT DOCUMENTS

| | | | |
|---|---|---|---|
| CN | 209940883 U | 1/2020 | |
| WO | 2005/051628 A1 | 6/2005 | |
| WO | WO-2019217268 A1 * | 11/2019 | ............ C08J 9/0023 |

OTHER PUBLICATIONS

Ahlgren et al. "Pulp and Paper Industry", IEA ETSAP—Technology Brief 107, (2015); pp. 1-9.*
Zhi Chao et al: "Warp-Knitted Spacer Fabric Reinforced Syntactic Foam: A Compression Modulus Meso-Mechanics Theoretical Model and Experimental Verification", Polymers, Jan. 1, 2020, XP055778577.
(Continued)

*Primary Examiner* — Prashant J Khatri
(74) *Attorney, Agent, or Firm* — Wood Herron & Evans LLP

(57) ABSTRACT

A composite material, comprising a first component and a second component, the first component forming a three-dimensional mesh-type structure and the second component forming a matrix at least regionally filling the interstices between the first component, wherein the second component at least partially comprises an expanded material.

1 Claim, 7 Drawing Sheets

Figure 1:
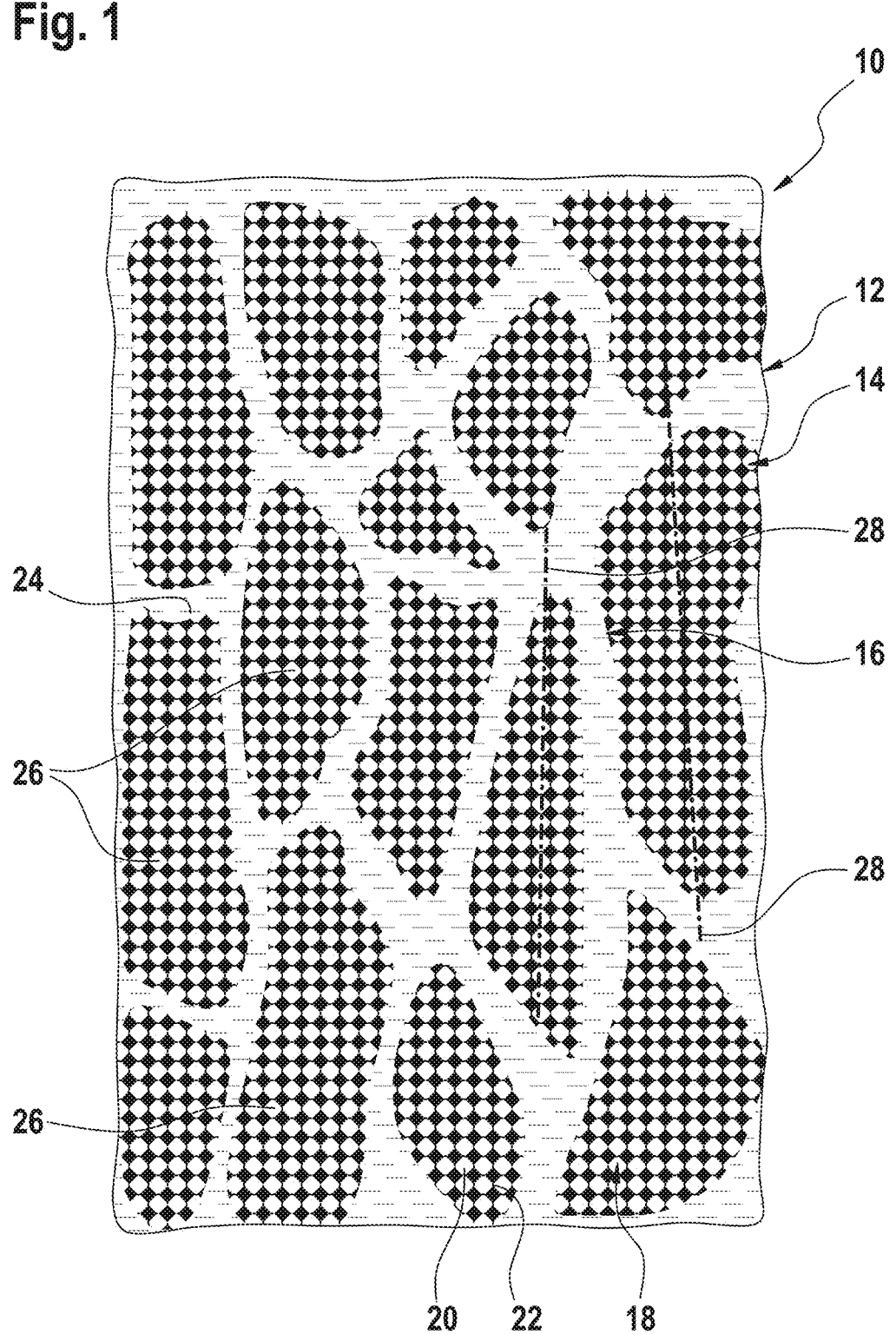

(51) Int. Cl.

| | |
|---|---|
| *B29C 44/34* | (2006.01) |
| *B29C 44/44* | (2006.01) |
| *B29C 44/58* | (2006.01) |
| *C08J 9/00* | (2006.01) |
| *C08J 9/236* | (2006.01) |
| *C08J 9/33* | (2006.01) |
| *B29K 67/00* | (2006.01) |
| *B29K 105/00* | (2006.01) |
| *B29K 105/04* | (2006.01) |
| *B29K 201/00* | (2006.01) |

(52) U.S. Cl.
CPC .......... *B29C 44/445* (2013.01); *B29C 44/586* (2013.01); *C08J 9/0061* (2013.01); *C08J 9/0085* (2013.01); *C08J 9/236* (2013.01); *C08J 9/33* (2013.01); *B29K 2067/04* (2013.01); *B29K 2105/04* (2013.01); *B29K 2105/251* (2013.01); *B29K 2201/00* (2013.01); *C08J 2303/02* (2013.01); *C08J 2367/04* (2013.01); *C08J 2401/02* (2013.01); *C08J 2467/04* (2013.01)

(56) References Cited

OTHER PUBLICATIONS

Keller Sabine: "Foam-filled spacer fabric for body protection-shock absorption based on the model of pomelo fruit", Dec. 18, 2019, XP055778582.

Wang Long et al: "Effect of Cellulose Nanofiber (CNF) Surface Treatment on Cellular Structures and Mechanical Properties of Polypropylene/CNF Nanocomposite Foams via Core-Back Foam Injection Molding", Polymers, Feb. 2, 2019, XP055818264.

Kasemphaibulsuk Pibulchai et al: "Foam injection molding of glass fiber reinforced polypropylene composites with aminate skins", Polymer Composites, Jul. 26, 2017, XP055818257.

EP 20 196 490.5 filed Sep. 16, 2020 European Search Report.

PCT/EP2021/075490 Written Opinion of the International Preliminary Examing Authority, Jul. 20, 2022.

PCT/EP2021/075490 International Preliminary Report on Patentability, Dec. 5, 2022.

PCT/EP2021/075490 International Search Report, Oct. 29, 2021.

PCT/EP2021/075490 Written Opinion of the International Searching Authority.

\* cited by examiner

Fig. 19
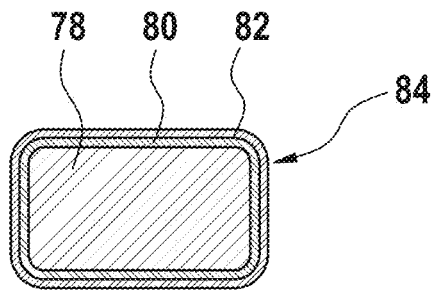
Fig. 20
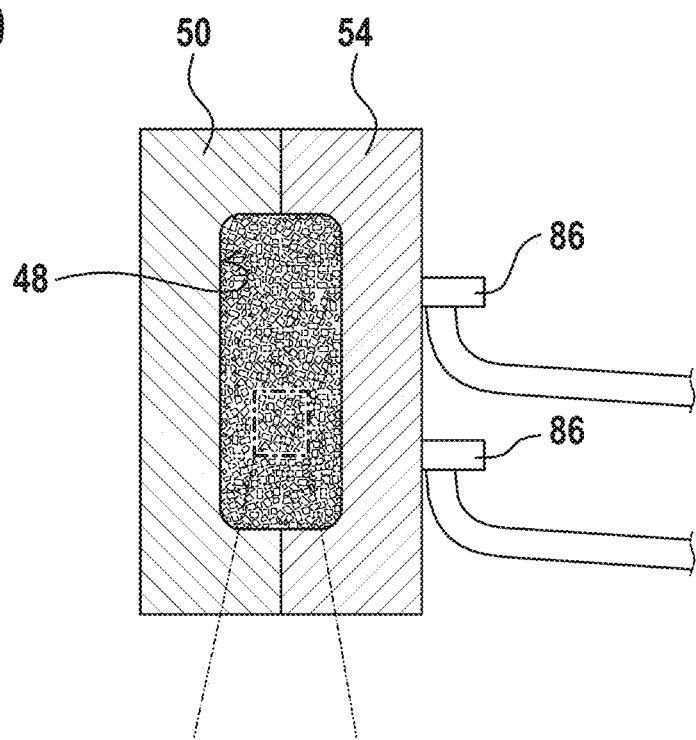
Fig. 21

COMPOSITE MATERIAL, METHOD FOR MANUFACTURING A PRODUCT MADE OF A COMPOSITE MATERIAL, AND MACHINE FOR MANUFACTURING A PRODUCT MADE OF A COMPOSITE MATERIAL

RELATED APPLICATIONS

This Application is a US National Phase Application of PCT/EP2021/075490 filed Sep. 16, 2021, which claims the priority benefit of European Patent Application No. 20196490.5 filed Sep. 16, 2020, both of which are hereby incorporated by reference herein as if fully set forth in their entirety.

The present invention relates to a composite material, a method for manufacturing a product made of a composite material, and a machine for manufacturing a product made of a composite material, according to the preambles of the independent claims.

WO 2005/051628 A1 discloses a method and an apparatus for manufacturing a biodegradable foam. A raw biodegradable material is placed into a mold and then heated by means of microwave heating. During microwave heating, the raw material is subjected to a controlled pressure increase and decrease using a compressed gas. The raw material may be starch or cellulose or a combination thereof. Such a biodegradable foam material may be used for packaging purposes, for example to protect fragile products from shock loads during transport.

The known method has a number of disadvantages. One of these disadvantages is the difference between internal raw material steam pressure generated by the microwave heating and the compressed gas pressure provided by the machine, which makes it difficult to control the overall pressure. Additionally, microwave heating leads to hot and cold spots within the material which by consequence leads to regions within the foam material having different and unpredictable material properties. Also, the known method has the risk of producing a product having undesired voids.

It is therefore an object of the present invention to provide a composite material, a manufacturing method and a manufacturing machine allowing to avoid the above mentioned disadvantages.

This object is achieved by means of a composite material, a method for manufacturing a product made of a composite material, and a machine for manufacturing a product made of a composite material having the features of the independent claims. Further embodiments are given in the dependent claims.

The invention allows to manufacture a product having a superior and desired homogeneity. The final product provides efficient shock absorbing characteristics even for heavy articles, and it can be entirely made from recycled biodegradable raw materials. The manufacturing process is a low cost process due to short cycle times and the use of high frequency electromagnetic radiation.

More specifically, the invention proposes a composite material, comprising a first component and a second component. The first component forms a three-dimensional mesh-type structure, which may be essentially solid and rigid, as it is principally known from state of the art composite materials, such as carbon epoxy materials or the like, but which also allows a certain degree of deformation in order to provide a certain deformability and elasticity of the overall composite material. The second component forms a matrix in the form of a porous network having air volumes in the material at least regionally filling the interstices between the first component. The matrix may work but does not have to work as a binder for mechanically connecting distant areas of the first component, again as principally known from state of the art composite materials. Its main purpose is to fill the interstices and—eventually—by means of the expansion to put under tension and thus stabilize the 3D-mesh. The tensile strength of the first component is higher than that of the second component.

In the present context, the term "foam" defines an essentially solid but deformable material comprising a multitude of small gas bubbles separated by thin solid (i.e. non-liquid) walls. Such a foam has a low density which reduces the weight of a final product made from such a composite material. The foam optionally may work as a binder in order to mechanically connect the three-dimensional mesh-type solid structure and to contribute to the overall stability of a product made from the composite material. The foam is generated by expansion of a starting material, and the expansion is enabled by using an expandable starting material comprising a substance which transforms into a gas upon application of energy, for example heat. However, it is principally possible to create the expanded material of the second component by a fiber entanglement.

Furthermore, the invention proposes a method for manufacturing a product made of the above-mentioned composite material. According to the invention, the method comprises the following steps: a. Providing a blend of at least a fibrous material and an expandable material. b. Placing the blend into a mold cavity wherein the mold cavity may be fully closed or in a slightly open state. c. Applying energy, preferably heat to the blend which is placed within the mold cavity. It is to be understood that in case of the application of heat this does not exclude that the blend already previously was heated. It is, however, important that the blend which is within the mold cavity is heated to a temperature level where expansion of the expandable starting material occurs. d. Keeping the mold cavity open at a certain and limited extent (in case it is already slightly open) or increasing the volume of the mold cavity to a certain and limited extent (especially in case it was initially fully closed), such that the expandable material can expand in the direction of the volume increment. The certain and limited extent is selected such that the expandable material does not fully expand but rather expands to the shape and dimension of the final product which shall be manufactured. e. Keeping the mold cavity essentially in the state where the volume is increased to the certain and limited extent until the material inside the mold cavity has stabilized. "Stabilized" means that any expansion activity has ceased and will not restart if the volume of the mold cavity is further increased or the mold cavity is opened.

Finally, the invention also proposes a machine for manufacturing a product made of the above-mentioned composite material. The inventive machine comprises: a mold cavity for receiving a blend of at least a fibrous material and an expandable material; a device for applying energy, preferably heat, to the blend which is placed within the mold cavity; means for keeping the mold cavity open at a certain and limited extent or for increasing the volume of the mold cavity to a certain and limited extent, such that the expandable material can expand, the first extent being selectable such that the expandable material does not fully expand; means for keeping the mold cavity essentially in the state where the volume is increased to the first extent until the blend inside the mold cavity has stabilized.

In a further embodiment of the composite material the first component comprises fibers or yarns. These materials can be processed easily to form a workable blend which is used as a starting material for manufacturing the composite material, and they reliably form the three-dimensional mesh-type solid structure of the final composite material when the second component is formed by expansion.

In a further embodiment of the composite material the fibers or yarns comprise one or more biopolymers preferably selected from the group comprising: polylactide, cellulose, flax, wool, cotton, hemp, bamboo, silk. All these materials are biodegradable and therefore have preferred ecological characteristics. Cellulose fibers allow to throw the material after use simply in the paper bin.

In a further embodiment of the composite material the second component comprises one or more biopolymers preferably selected from the group comprising: polylactide, polyhydroxyalcanoate, protein, polysaccharide (starch/thermoplastic starch ("TPS"), alginates, lignin, or the like). Thermoplastic starch is free of native crystallinity such that it becomes an amorphous raw material. The process of removal of native crystallinity is called "gelatinization". The most used industrial process to obtain TPS is by extruding starch with 25-35% of water. Again, all these materials are biodegradable and therefore have preferred ecological characteristics. Furthermore, they firmly attach to the above mentioned fiber or yarn materials and therefore perfectly the as a binder, and they can easily be provided as an expandable material, the expansion being triggered for example simply by applying heat. Especially the combination of expanded thermoplastic starch with a fiber network lowers the sensitivity of the composite material to environmental moisture. It is also to be mentioned that cellulose, starch, lignin belong to the same polymer family.

In a further embodiment of the composite material the three-dimensional mesh-type and essentially solid structure made of the first component at least partially comprises lengthy cells with an essentially parallel orientation. This characteristic may be caused in case that during manufacturing at least regionally the material is allowed to expand only in one direction. Of course, especially with products having a complex shape, there might be different expansion directions which, by consequence, may lead to regions of the product with different orientations of the lengthy cells.

In a further embodiment of the composite material it comprises at least a first area and a second area, the material density in the first area being different than in the second area. Such a type of composite material may be created by allowing the material to expand in the first area at a degree which is different to the expansion in the second area. By consequence, a material can be created having for example regions with higher density and therefore higher stiffness and higher strength than other regions, which allows to design the product according to the specific application needs.

In a further embodiment of the method the fibrous material comprises one or more biopolymers preferably selected from the group comprising: polylactide, cellulose, flax, wool, cotton, hemp, bamboo, silk, and/or wherein the expandable material comprises one or more biopolymers preferably selected from the group comprising: polylactide, polyhydroxyalcanoate, protein, polysaccharide (starch/thermoplastic starch, alginates, lignin, or the like). Again, these materials are preferred for ecological reasons.

In a further embodiment of the method the blend comprises additionally at least one of the following components: lignin, recycled paper, water. These additional components allow for example to define a specific viscosity of the blend or any other characteristic which may influence the property of the blend or of the final product.

In a further embodiment of the method in step c heating is performed by means of high frequency electromagnetic radiation. The frequency of the electromagnetic radiation is preferably in the range from 6 to 40 megahertz. Preferably, the electromagnetic radiation is created by applying an electric current between two plates as it is known from a capacitor. An oscillation is applied to the current creating oscillation of the water molecules present in the blend and hence causes heating. The wavelength of the electromagnetic radiation preferably is longer than the maximum dimension of the mold cavity which allows to avoid any hot or cold spots.

This type of high-frequency electromagnetic radiation has the advantage over for example microwave radiation that it penetrates uniformly the entire material which again helps to avoid cold or hot spots and, by consequence, helps to uniformly heat the material. It is to be understood that for this type of heating the material of the mold has to be as transparent as possible to such an electromagnetic radiation which allows the use of plastic material for manufacturing the mold.

In a further embodiment of the method after step b the volume of the mold cavity is reduced. By doing so, the blend within the mold cavity is compressed such that any undesired void, air and water is removed. This further enhances the quality of the final product.

In a further embodiment of the method the expandable material is provided in the form of a powder or in the form of pellets. On the one hand, such a powder or such pellets can be manufactured with known methods, such as extrusion. On the other hand, such a powder and such pellets can be easily handled when mixing the blend.

In a further embodiment of the machine the mold cavity is at least partially delimited by an elastic wall. This allows to produce products having a complex shape.

In a further embodiment of the machine the heating device comprises an emitter for emitting high frequency electromagnetic radiation.

Figure 2:
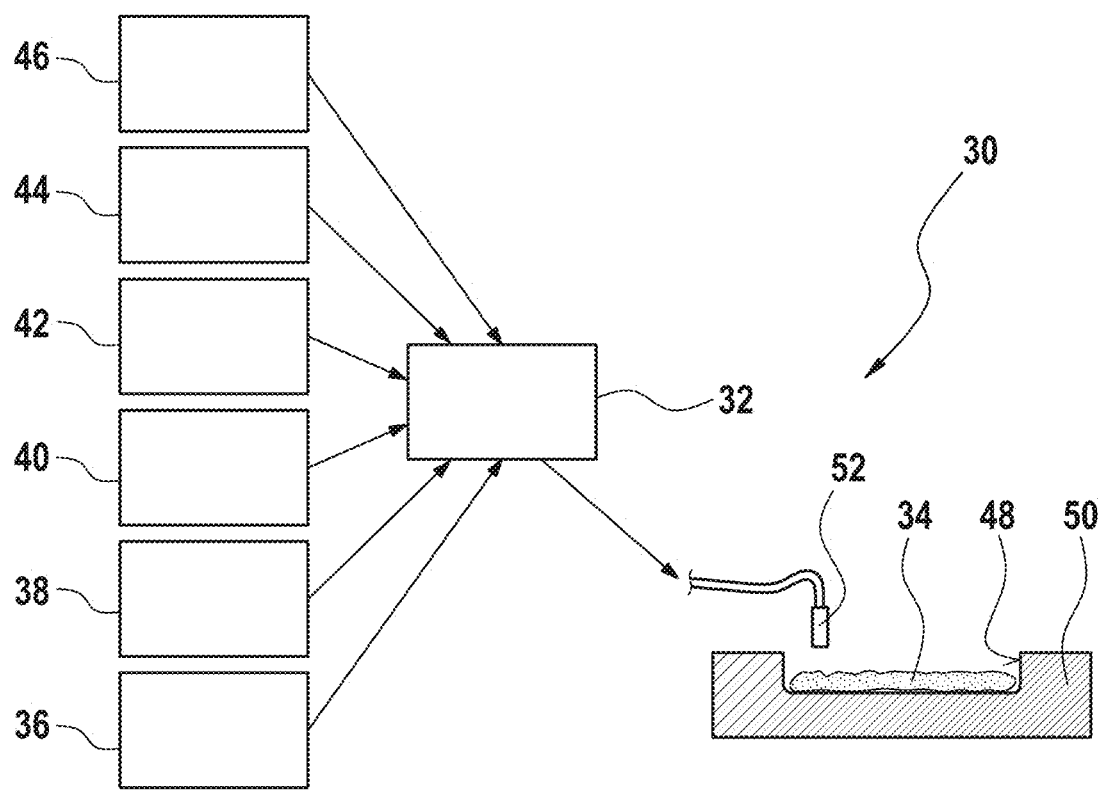
Figure 3:
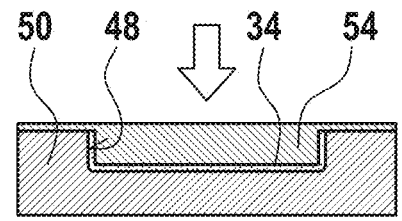
Figure 4:
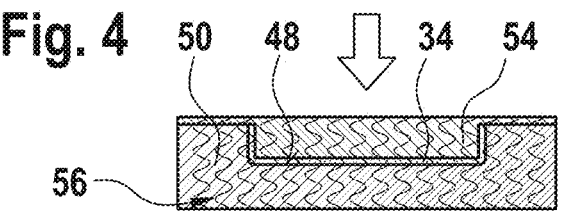
Figure 6:
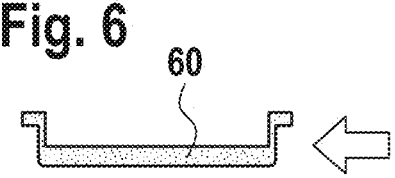
Figure 5:
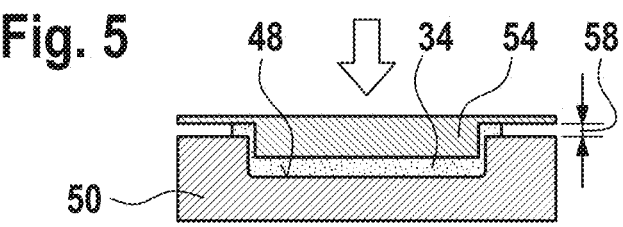
Figure 7:
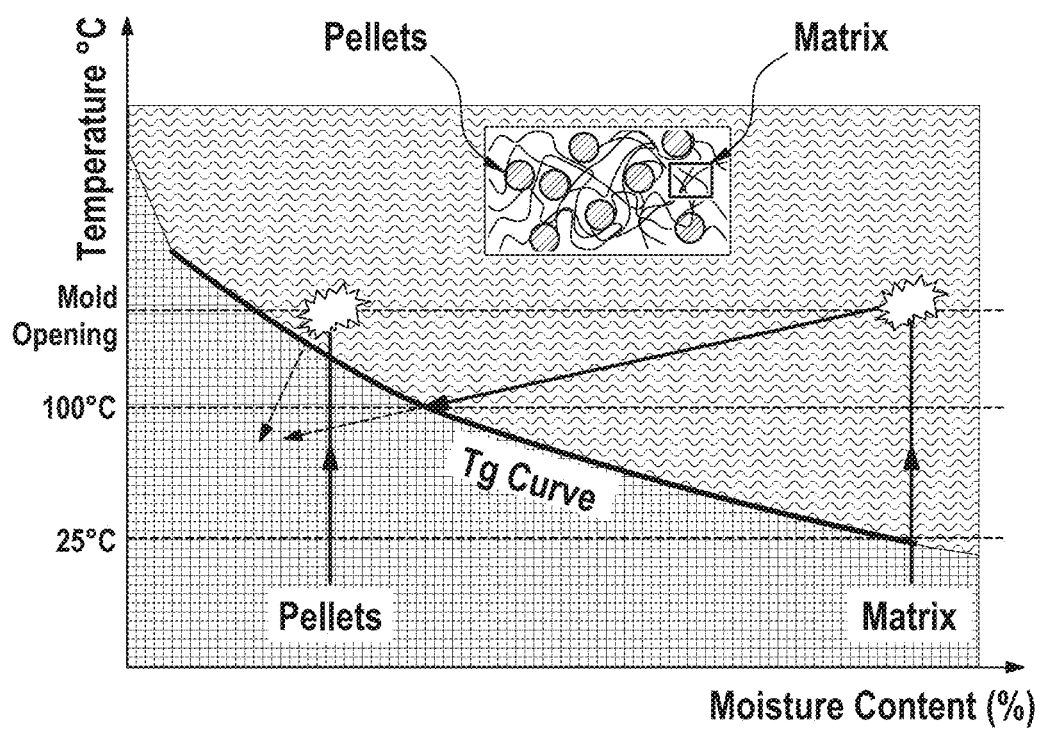
Figure 8:
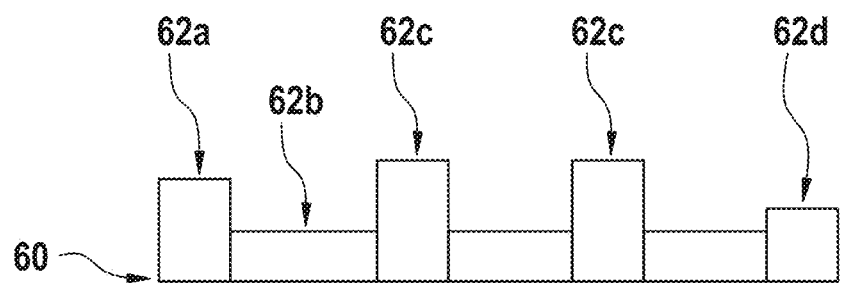
Figure 9:
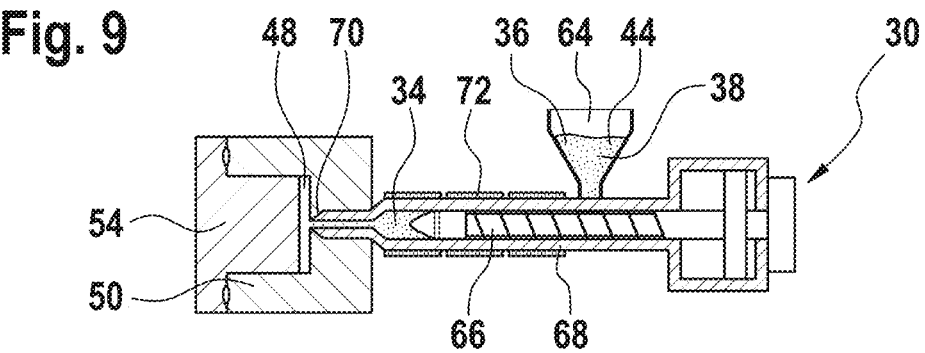

Embodiments of the invention are now described in further detail with reference to the attached drawing. In the drawing is shown by FIG. 1 an enlarged sectional view of a composite material according to the invention having a first component forming a mesh-type solid structure and a second component comprising an expanded foam;

FIG. 2 a schematic representation of a machine for manufacturing a product made of the composite material of FIG. 1 at a first moment of time during manufacturing;

FIG. 3-5 views similar to FIG. 2 at further moments of time;

FIG. 6 a sectional view of the final product manufactured according to FIGS. 2-5;

FIG. 7 a diagram of the glass temperature over the moisture content of a blend for manufacturing the composite material of FIG. 1;

FIG. 8 a schematic representation of a final product having regions with different densities;

FIGS. 9-12 an alternative embodiment of a machine for manufacturing a product made of the composite material of FIG. 1 at different moments of time during the manufacturing process;

FIGS. 13-18 a further alternative embodiment of a machine for manufacturing a product made of the composite material of FIG. 1 at different moments of time during the manufacturing process; and FIGS. 19-22 further alternative embodiments of a machine for manufacturing a product made of a composite material, and alternative embodiments of the composite material.

In the following detailed description functionally equivalent elements and regions are designated with the same reference numerals. Furthermore, for the sake of clarity not in all figures all possible reference numerals are shown.

A composite material 10 comprises a first component 12 and a second component 14. The first component 12 forms a mesh-type and essentially solid structure 16. It is to be understood that the first component 12 forms a three-dimensional mesh-type structure, that is a structure which is mesh-type not only in the plane of FIG. 1 but also in a direction perpendicular to the plane of FIG. 1. It is to be understood that the term "mesh" also encompasses any type of porous structure having open and/or closed cells. The second component 14 forms a three-dimensional matrix which fills the interstices or cells, respectively, between the first component 12. The second component 14 is in the form of an expanded foam 18. The foam 18 is an essentially solid material comprising a multitude of small gas bubbles separated by thin solid (i.e. non-liquid) walls 22. The foam 18 acts as a binder between the structure 16.

The first component 12 comprises fibers 24 which in the present exemplary embodiment are made of cellulose. In other non-shown embodiments the fibers may comprise one or more other biopolymers. Those biopolymers may be selected from the group comprising: polylactide, flax, wool, cotton, hemp, bamboo, silk. In other non-shown embodiments the first component may comprise yarns. It is to be understood that the first component may comprise a combination of fibers and yarns, and may comprise a combination of the above mentioned biopolymers.

In the present exemplary embodiment the second component 14 is also made from a biopolymer, namely thermoplastic starch. However, in other non-shown embodiments the second component may comprise one or more other polysaccharides than starch, such as alginates, lignin, or the like. In other non-shown embodiments the second component may comprise polylactide, polyhydroxyalcanoate, and/or protein.

As can be seen from FIG. 1, the solid structure 16 of the first component 12 in the present exemplary embodiment comprises irregularly shaped lengthy cells 26 with a more or less, that is essentially parallel orientation. This is indicated by way of example by two longitudinal axes 28 of adjacent cells 26. While the solid structure 16 has a relatively high density and therefore provides a relatively high stability to the composite material 10, the foam 18 has a relatively low density and therefore reduces the overall weight of the composite material 10.

In FIG. 2, a machine for manufacturing a product made of the composite material 10 is generally designated with reference numeral 30. The machine 30 comprises a mixing device 32 for mixing a number of raw materials and for providing a blend 34. It is to be understood that the mixing device 32 is not necessarily part of the machine 30. This means that the machine 30 may receive the blend 34 also from a storage hopper or any other storage device. The mixing device 30 receives a number of different raw materials, such as thermoplastic starch particles or pellets 36 as an expandable material, cellulose fibers 38 as a fibrous material, and lignin 40, recycled paper 42, water 44, and other suitable additives 46.

The thermoplastic starch may be provided in the form of pellets at a size in the range of 2-5 mm. The thermoplastic starch pellets may be grinded to obtain a powder with particles at a size from 200 to 1000 µm. Cellulose may be provided as wood fibers or other plant fibers, such as from flax or hemp, however being free from lignin.

Other materials added to the mixing device 32 are preferably other natural polymers. Natural polymers are biobased polymers which are not chemically modified, such as other polysaccharides than cellulose and starch as lignin, pullulans, alginates, chitin, chitosan, natural rubbers, rosinic acid, dextrin or proteins such as gluten, zein, casein, collagen, gelatin, phospholipids, caseins and their derivatives such as for example esters or ethers. Preferably lignin is used for its hydrophobic properties and microcrystalline cellulose for its rheological properties and its mechanical performances.

Some chemically biobased modified polymers, for example from home compostable, can be added as polyhydroxyalcanoate (PHA) polymers. Also, industrially compostable polymers can be added as PBAT, PBT or PLA. Fossil based polymers which are non-compostable can be used as additives but in small contents and only as processing aid: Vinyl polymers as polyvinyl alcohol, polyolefin as low density polyethylene or polyethylene glycol or ethylene-vinyl alcohol. Glycerin, polyglycerol, sorbitol, mannitol, erythritol, low molecular weight polyvinyl alcohol, as well as oxyethylate or oxypropylate derivates can also be used. Inorganic additives can be added as nucleating agent and charges: talc (magnesium silicate), calcium carbonate, and/or nanoparticles such as montmorillonites and hydrotalcites.

The blend 34 comprises water 44 for providing a desired viscosity and for providing an agent which can be heated by radiation, as will be explained further below. The blend 34 also comprises the fibers 38, fillers, and additives 40, 42, and 46 in order to obtain the desired properties of the composite material 10 and a final product made of the composite material 10. The moisture content in the blend preferably is in the range of 20 to 90% and more preferably around 60%. Preferably, some thermoplastic starch particles or pellets 36 are in the mixture and preferably the pellets have an hydrophobic skin layer, for example a lignin coating. The objective of this type of thermoplastic starch pellets 36 (in the form of micropellets or powder) is to control expansion during later expansion, as will be described herein below.

A typical example for producing the blend 34 in the mixing device 32 is given hereinafter: 90 kg of water 44 and 10 kg of corn starch 36 are introduced in a tank and kneaded at 85° C. for 15 min at 100 rpm. After 15 min an homogeneous gelatinized starch (thermoplastic starch) is obtained. 12 kg of cellulose fibers 38 are added to the mixture. The cellulose fibers 38 have an average length of 2.5 mm. After another 5 min of kneading, an homogeneous matrix is obtained. Thereafter, another 8 kg of thermoplastic starch 36 with 13% water content is introduced to the mixture. The thermoplastic starch 36 is in the form of pellets having an average diameter of 2.5 mm. The mixture is kneaded for another 5 minutes in order to obtain the blend 34.

The blend 34 is placed into an open mold cavity 48 of a first mold half 50. Preferably, the blend 34 is placed in the open mold cavity 48 by means of a nozzle 52 of a 5-axis robotic device (non-shown). This is particularly preferred in the case that the blend 34 has a rather high viscosity. In another not shown embodiment the blend is injected into the mold cavity as is known from standard injection molding.

As can be seen from FIG. 3, in the present exemplary embodiment the mold cavity 48 is closed by means of a second mold half 54. The second mold half 54 is used to reduce the volume of the mold cavity 48 and thus to compress the blend 34 received in the mold cavity 48. This ensures that the blend 34 entirely fills out the mold cavity 48 and that all air and excess water are evacuated from the blend 34 and the mold cavity 48, respectively. In order to evacuate air and water, grooves (not shown) may be provided in the surface of the first and/or second mold half 50, 54, respectively, outside of the mold cavity 48.

Both mold halfs 50 and 54 are made of a dielectric material, such as plastic. Preferred materials for the mold are PTFE, PEEK, PEKK, PEI because of their transparency to electromagnetic radiation and their temperature resistance. Other materials having lower temperature resistance also can be used, but in this case they preferably should not come into direct contact with the heated material inside the mold cavity 48. Such materials are for example PS, PP, PE.

These materials are known to be non-polar materials leading to very low sensitivity to electricity, heating and electromagnetic fields. An important advantage of many plastic materials, especially of thermoplastic materials, such as PTFE, PEEK, PEKK, PEI, PS, PP, and PE is that they can be 3D printed which reduces time and cost for manufacturing the mold halfs 50 and 54 compared to traditional metal machined mold halfs.

As can be seen from FIG. 4, the compressed blend 34 received within the mold cavity 48 is heated by means of high frequency electromagnetic radiation 56. To this end, the machine 30 comprises a suitable heating device (not shown) which in the present exemplary embodiment may comprise two plate means, namely a passive plate means and an active plate means.

For heating, an electric current is applied to the active plate means creating an electromagnetic field and a type of capacitor effect. An oscillation is applied to the electric current creating an oscillation of the water content in the blend 34 which, by consequence, causes heating of the blend 34. The frequency applied preferably is in the range from 6 to 40 MHz with a wavelength longer than the maximum dimension of the mold cavity 48 to avoid any hot/cold spots.

During heating, the expandable material provided by the starch particles 36 is in a glassy state in some areas within the mold cavity 48 (particles) and in a rubbery state in other areas within the mold cavity 48 (matrix). This difference is related to the water content which may vary from one area to another area and to the fact that the glass transition temperature (Tg) of thermoplastic starch depends on the water content (see FIG. 7).

Preferably, the mold cavity 48 is sealedly closed prior to the above mentioned heating step. By consequence, during heating not only the water temperature but also the pressure inside the mold cavity 48 raises. This allows the water and thus the blend 34 to reach a temperature which may be higher than 100° C., which in turn allows the starch particles 36 to change into a rubbery state even in regions having only a rather low water content. With the temperature of the water 44 in the blend 34 being above the boiling temperature and the thermoplastic starch particles 36 being in a rubbery state, cells 20 start to appear in the material ("cell nuclei"). Steam migrates into these cells. Nucleating agent as talc helps to increase cell apparition.

After heating has occurred, the thermoplastic starch particles 36 have reached the rubbery state and the cell nuclei have appeared. Now, the volume of the mold cavity 48 is increased to a certain and limited extent 58, as can be seen from FIG. 5. The extent 58 is selected such that the expandable starch particles 36 do not fully expand by a further and unlimited but only by a limited increment of the sizes of the cells 20 and that a final product 60 (FIG. 6) has a desired shape and dimension. After the defined volume increment, the volume of the mold cavity 48 is kept essentially constant until the material 10 inside the mold cavity 48 has stabilized.

Preferably, the above described volume increment of the mold cavity 48 is realized within a relatively short period of time, that is suddenly. When the volume of the mold cavity 48 suddenly increases, the pressure inside the mold cavity 48 drops. This makes hot steam to expand the cells 20 and to leave the intermediate material and the mold cavity 48. Since the hot steam leaves the mold cavity 48, the temperature of the material inside the mold cavity 48 decreases. When the temperature of the material decreases below the glass Temperature Tg of the starch 36, the material stabilizes and preserves the dimension and shape, even if the mold cavity 48 is further opened in order to remove the final product 60 (FIG. 6). In the composite material 10 of the product 60 the volume is taken mostly by expanded starch, and a network of fiber and expanded starch is located around these areas.

In a non-shown embodiment, the machine 30 may comprise a first and/or second mold half forming a mold cavity for manufacturing a product having regions with different thicknesses. When the mold cavity is slightly open to during the expansion step, the material inside the mold cavity will expand differently from region to region. This leads to a final product having regions of a defined density varying from one region to another region. This is schematically shown in FIG. 8 for a product 60 having four different density areas 62*a-d*.

The final product 60 made of the composite material 10 in the present exemplary embodiment may have a density of 45 g/l. It comprises areas (cells 26) of pure expanded foam 18 having a size from 3-25 mm. These cells 26 filled with foam 18 have a relatively low density from 10-30 g/l. The cells 26 are enclosed by the above mentioned solid structure 16 of cellulose fibers 24. The thickness of the elements of the solid fiber structure 16 may be in the range from 0.1-3.0 mm. This disparity of wall thicknesses is mainly caused by the heterogeneity of the blend 34.

Now, reference is made to FIG. 9-12 showing another embodiment of a machine 30. The machine 30 of FIGS. 9-12 comprises a hopper 64 for introducing the raw materials composing the blend 34. In the present exemplary embodiment, the fibrous material 38 is provided as pellets of cellulose fibers with a length lower than 1 mm. The expandable material 36 is provided as gelatinized starch from peas. The relation is 60% cellulose fibers 38 and 40% starch 36. Furthermore, PVA (not shown) and water 44 are also introduced into the hopper 64.

The machine 10 further comprises a screw 66 within a barrel 68 having an injection nozzle 70. The hopper 64 is connected to the inside of the barrel 68. Radially outwardly of the barrel 68 a heating device 72 is provided. The screw 66 doses the desired blend amount and conveys the blend 34 directly into a mold cavity 48.

Figure 10:
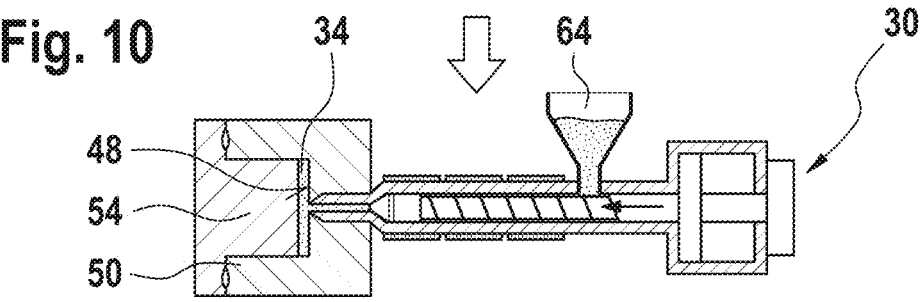
Figure 11:
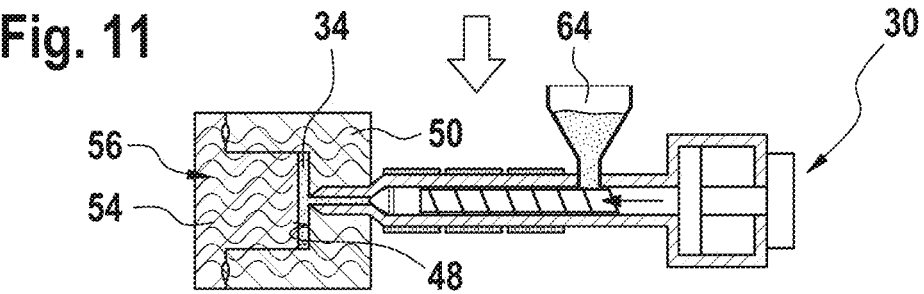
Figure 12:
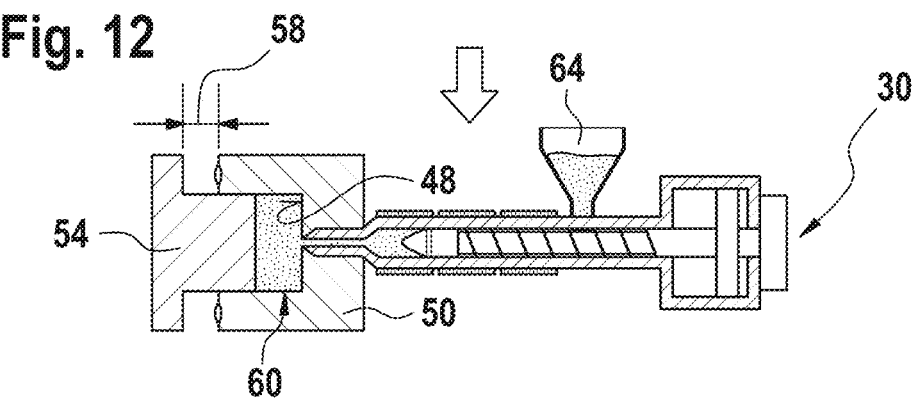
Figure 13:
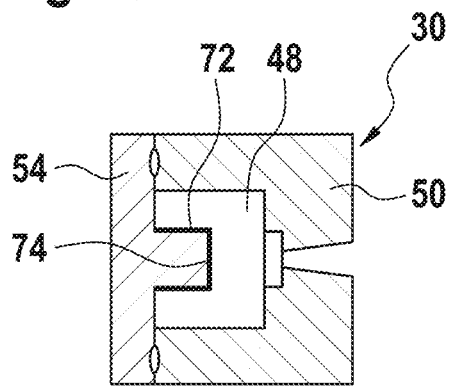
Figure 14:
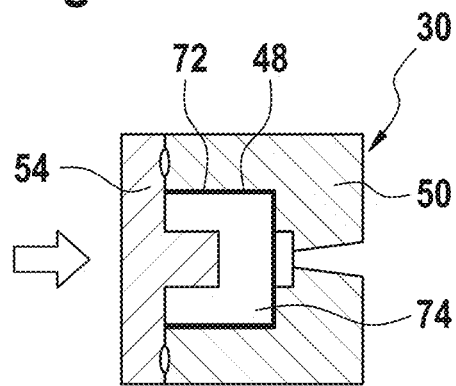
Figure 16:
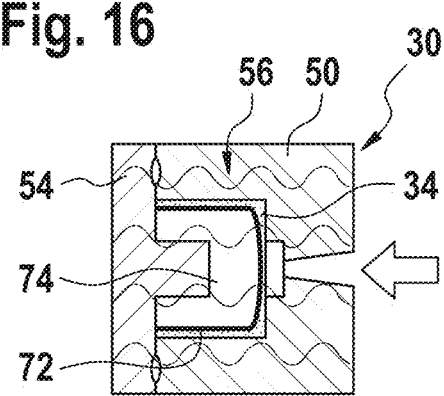
Figure 15:
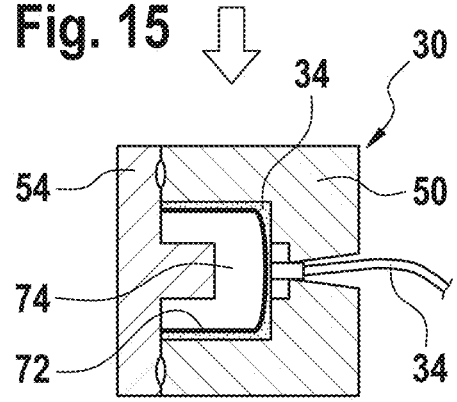

During the dosing process provided by the screw 66 the cellulose fiber pellets 38 are melt. The rotational speed of the screw 66 is selected in order to avoid too much shearing effects and to keep the melted material just below 100° C. The melted blend 34 is conveyed by means of the injection nozzle 70 into the mold cavity 48 (FIG. 10). As was explained with respect to the first embodiment of a machine 10, the blend 34 received within the mold cavity 48 is heated by means of high frequency electromagnetic radiation 56 (FIG. 11). Thereafter, the volume of the mold cavity 48 is suddenly increased (FIG. 12) by a certain and limited extent 58.

The final product 60 obtained by this method has a density of 90 g/l with areas 26 with pure foam 18 having a size ranging from 0.1 to 3 mm. These areas have low densities ranging from 10 to 30 g/l. These cell-type areas 26 with foam 18 are enclosed in a cellulose fiber network structure 16.

A still further embodiment of a machine 30 for manufacturing a final product 60 made of a composite material 10 and its functional principles are now explained with reference to FIGS. 13-18. The mold cavity 48 is formed between the first mold half 50 and the second mold half 54. Towards the second mold half 54, the mold cavity 48 is delimited by a bladder type elastic wall 72, for example formed from a silicone material.

The edges of the elastic wall 72 are air tightly fixed to the second mold half 54. A space 74 between the second mold half 54 and the elastic wall 72 is fluidly connected to a pressurized gas supply which allows to apply a gas pressure to the space 74, as desired. At least the wall of the first mold half 50 delimiting the mold cavity 48 is made of PTFE.

The machine 30 of FIGS. 13-18 may be used as follows: 90 kg of water and 10 kg of native pea starch are introduced into a receptacle (not shown) and kneaded at 85° C. for 50 minutes at 100 rpm. When kneading has ended after 15 minutes, an homogeneous gelatinized starch (thermoplastic starch) is obtained. Thereafter, 12 kg of cellulose fibers are added to the starch. The fibers have an average length of approximately 1.5 mm. The mixture of fibers and starch is further kneaded for 5 minutes, and after these 5 minutes an homogeneous matrix is obtained. Thereafter, 8 kg of thermoplastic cornstarch powder with 13% water content are introduced to the matrix. The cornstarch powder has a particle size distribution of D(1,0) 1200 μm and D(0,5) 800 μm. Again, the mixture is kneaded for further 5 minutes. The result is a blend 34 which is ready to be used in the machine 30.

In a first step (FIG. 13), the first mold half 50 and the second mold half 54 are approached to each other such that the mold cavity 48 becomes closed. In a second step (FIG. 14), gas pressure is applied to the space 74 such that the flexible wall 72 expands and comes to lie against the wall of the first mold half 50 delimiting the mold cavity 48. The gas pressure inside the space 74 may be approximately 3 bar.

In a third step (FIG. 15), the blend 34 is injected through the nozzle 52 into the mold cavity 48 with a pressure between approximately 3.5 and 5 bar. After a predefined volume or mass of blend 34 has been injected into the mold cavity 48, injection is stopped, and the pressure inside the space 74 is further increased to approximately 9 bar. Furthermore, the heating device (not shown) starts emitting high frequency electromagnetic radiation 56 (FIG. 16) for approximately 30 seconds. This raises the temperature of the blend 34 within the mold cavity 48 to approximately 190° C.

Figure 17:
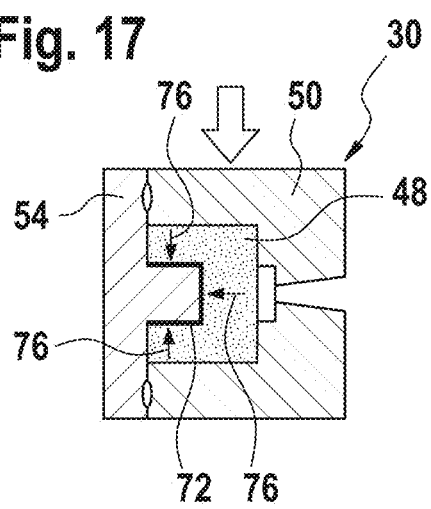
Figure 18:
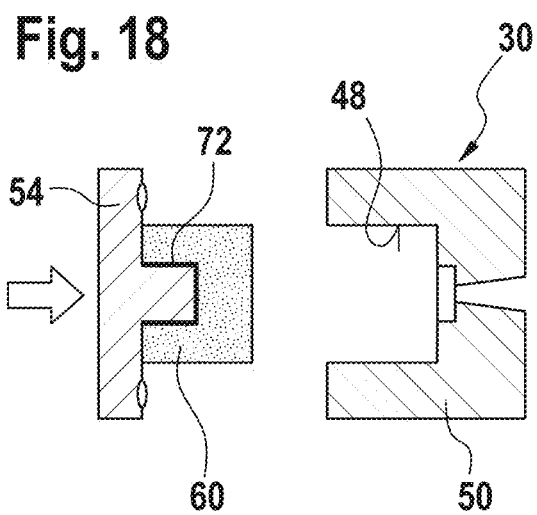

As can be seen from FIG. 17, thereafter the pressure in the space 74 is suddenly reduced to environmental pressure. This allows the volume of the mold cavity 48 to suddenly increase until the elastic wall 72 comes to lie against the 30 second mold half 54. In this case, expansion of the material inside the mold cavity 48 occurs not only in one direction but rather in multiple directions as is indicated by arrows 76 in FIG. 17. These directions are the moving directions of the elastic wall 72 during the sudden pressure decrease in space 74. After the material inside the mold cavity 48 has stabilized after its expansion, the mold cavity 48 can be opened and the final product 60 can be removed (FIG. 18).

The final product 60 obtained by the method and machine 30 of FIGS. 13-18 has a density of 60 g/l. In the final product 60 exist areas (cells 26) of pure foam 18 having an extension of 0.5 to 8 mm and a density in the range from 10 to 30 g/l. These three-dimensional cells 26 of pure foam 18 are at least partially enclosed in a solid structure 16 of fibers 24 having wall thicknesses in the range from 0.1 to 3 mm.

A further alternative embodiment of a composite material 10 will be explained with reference to FIGS. 19-21: expanded starch beads 78 are wrapped in coated paper 80, the paper being coated with a starch glue 82. The three components 78, 80, and 82 form already expanded pellets 84. A multitude of such wrapped and already expanded pellets 84 is then filled in the mold cavity 48 by means of so-called "bead fill guns" 86, which are a sort of injector for introducing the pellets 84 into the mold cavity 48. By means of hot steam, the paper 80 and the glue 82 are transformed into a three-dimensional mesh-type and essentially solid structure 16 (first component 12), the glue 82 binding the paper 80 together, whereas the already expanded starch beads 78 form the expanded material 18 (second component 14) of the composite material 10.

Figure 22:
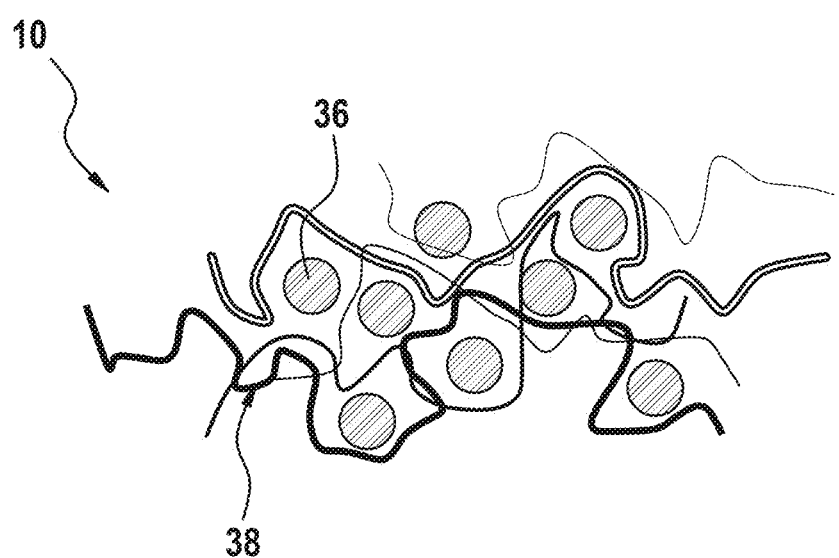

A further alternative embodiment of a composite material 10 will be explained with reference to FIG. 22: Recycled expanded polystyrene beads 36 are mixed with hemp fibers 38 impregnated by a fire retardant ammonium polyphosphate. The mixture is placed for 24 hours in a high humidity environment having 78% relative humidity. Ammonium polyphosphate is a salt. It helps to catch environmental humidity. When the mixture has a humidity of approximately 18% wt., it is introduced in a mold, as shown above with respect to the other embodiments. High frequency is applied in order to heat the fibers up to 100° C. By doing so, the water comprised in the mixture vaporizes and welds the expanded polystyrene beads 36 together.

LIST OF REFERENCE NUMERALS 10 composite material
12 first component
14 second component
16 3D mesh type structure
18 foam
20 gas bubbles
22 walls
24 fibers
26 cell
28 longitudinal axis
30 machine
32 mixing device
34 blend
36 starch particles
38 cellulose fibers
40 lignin
42 recycled paper
44 water
46 suitable additives
48 mold cavity
50 first mold half
52 nozzle
54 second mold half
56 electromagnetic radiation
58 certain and limited extent
60 final product
62 density areas
64 hopper
66 screw
68 barrel
70 injection nozzle 72 elastic wall
74 space
76 arrows in FIG. 17
78 expanded starch beads
80 coated paper
82 starch glue
84 pellets
86 bead fill guns

The invention claimed is:

1. A composite material, comprising a first component and a second component, the first component forming a three-dimensional mesh structure and the second component forming a matrix at least regionally filling the interstices between the first component, wherein the second component comprises an expanded material, wherein the first component comprises cellulose fibers forming the three-dimensional mesh structure and the second component is made from thermoplastic starch provided in the form of pellets, the second component is in the form of pure expanded foam.

* * * * *